United States Patent
Hunt et al.

(10) Patent No.: US 11,463,032 B2
(45) Date of Patent: Oct. 4, 2022

(54) DETECTING ROTOR ANOMALIES BY DETERMINING VIBRATION TRENDS DURING TRANSIENT SPEED OPERATION

(71) Applicant: General Electric Company, Schenectady, NY (US)

(72) Inventors: Lucas Christopher Hunt, Marietta, GA (US); Kiran Vangari, Telangana (IN); Robert Pries, Dättwil (CH)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 16/679,389

(22) Filed: Nov. 11, 2019

(65) Prior Publication Data
US 2021/0143762 A1 May 13, 2021

(51) Int. Cl.
*H02P 9/10* (2006.01)
*F01D 25/04* (2006.01)
(Continued)

(52) U.S. Cl.
CPC .............. *H02P 9/102* (2013.01); *F01D 25/04* (2013.01); *H02P 8/34* (2013.01); *H02P 21/0021* (2013.01); *F05D 2220/32* (2013.01)

(58) Field of Classification Search
CPC ...... H02P 25/032; H02P 25/00; H02P 25/022; H02P 25/062; H02P 25/064; H02P 9/008; H02P 25/08; H02P 27/00; H02P 27/04; H02P 27/06; H02P 27/05; H02P 27/026; H02P 29/00; H02P 29/02; H02P 29/024; H02P 29/0243; H02P 1/00; H02P 1/04;
(Continued)

(56) References Cited

U.S. PATENT DOCUMENTS 4,485,678 A * 12/1984 Fanuele ................. G01H 1/003
73/660
2010/0161245 A1 6/2010 Rai et al.
(Continued)

FOREIGN PATENT DOCUMENTS

EP 2399104 B1 12/2012
WO 2004059399 A2 7/2004

OTHER PUBLICATIONS

European Search Report and Written Opinion for corresponding EP Application No. 20205562.0-1001 dated Mar. 20, 2021, 9 pages.

*Primary Examiner* — Antony M Paul
(74) *Attorney, Agent, or Firm* — James Pemrick; Charlotte Wilson; Hoffman Warnick LLC (57) ABSTRACT

An approach for detecting rotor anomalies is disclosed. Vibration data for a vibration sensor(s) and for a transient speed operation is classified into a plurality of rotor speed ranges. A predetermined percentile vibration amplitude is determined for each rotor speed range for the vibration sensor(s). Using historical vibration measurement data obtained from a predetermined number of previous transient speed operations performed by at least the rotor, it is determine whether a vibration measurement obtained during the transient speed operation is indicative of a rotor anomaly by determining whether a trend exists in the predetermined percentile vibration amplitude for at least one of the rotor speed ranges and the vibration sensor(s) over a preset number of previous transient speed operations. A rotor anomaly is indicated where a trend exists.

20 Claims, 6 Drawing Sheets

(51) Int. Cl.
*H02P 8/34* (2006.01)
*H02P 21/00* (2016.01)

(58) Field of Classification Search
CPC .... H02P 1/163; H02P 1/24; H02P 1/26; H02P 1/30; H02P 1/42; H02P 1/46; H02P 1/465; H02P 5/00; H02P 5/69; H02P 6/00; H02P 6/005; H02P 6/04; H02P 6/08; H02P 6/12; H02P 6/14; H02P 6/26; H02P 7/00; H02P 7/245; H02P 7/2805; H02P 9/00; H02P 21/00; H02P 21/0021; H02P 21/04; H02P 23/00; H02P 23/03; H02P 23/14
See application file for complete search history.

(56) References Cited

U.S. PATENT DOCUMENTS

| | | |
|---|---|---|
| 2013/0167649 A1 | 7/2013 | Heda et al. |
| 2016/0054171 A1 | 2/2016 | Maalouf |

* cited by examiner

DETECTING ROTOR ANOMALIES BY DETERMINING VIBRATION TRENDS DURING TRANSIENT SPEED OPERATION

BACKGROUND OF THE INVENTION

The present disclosure relates generally to rotor monitoring and more particularly to evaluating trends in vibrations for one or more speed ranges during transient speed operation to monitor a rotor for anomalies.

Vibration monitoring is often used to monitor a rotor of a turbine for anomalies. In one approach, vibration monitoring of a turbine rotor for anomaly detection involves a specialist reviewing vibration measurements obtained from a turbine during full-speed operations. The specialist typically reviews the vibration measurements for changes in vibration to determine the presence of an anomaly. In order to delve further into the severity of the anomaly, the specialist has to manually organize and analyze all of the information and data obtained during the full-speed operation of the turbine. This is a very time-consuming process to analyze an anomaly condition that does not result in a real-time solution. Another shortcoming with these vibration monitoring processes is that only vibration measurements obtained from a turbine operating at full-speed operations are used. Some failure events that result in anomalies cannot be detected using data obtained from a turbine at full-speed operations.

In another approach, vibration measurements are obtained from a turbine operating at transient speed operations such as a startup or shutdown. This approach allows for detection of anomalies that are undetectable at full-speed operations. In one particular approach, vibration measurements are classified into one of a plurality of predetermined ranges of rotor speed during the transient speed operation, and maximum vibration data is determined for each of the predetermined ranges of rotor speed during the transient speed operation. The data is then compiled into a snapshot. A remote monitoring unit (e.g., remote from the vibration sensor(s) doing the measuring, the rotor and any on-site monitoring unit) detects a rotor anomaly from the snapshot of vibration measurements. In this approach, vibration data is evaluated to simply determine that the vibration measurement is non-repeating. That is, a vibration measurement is either increasing or decreasing from a previous value by a predetermined threshold. Using just non-repeating vibration measurements as an indication of the presence of an anomaly can lead to a number of false indications.

BRIEF DESCRIPTION OF THE INVENTION

A first aspect of the disclosure includes a computing system for detecting rotor anomalies in a rotor during transient speed operation, the computing system comprising a computing device programmed to: receive vibration data obtained from the rotor by at least one vibration sensor during the transient speed operation; classify the vibration data into one of a plurality of predetermined rotor speed ranges of the transient speed operation for the at least one vibration sensor, each speed range being between a standstill state and a full speed state of the rotor; determine a predetermined percentile vibration amplitude for each of the plurality of predetermined rotor speed ranges of the transient speed operation for the at least one vibration sensor; and using historical vibration measurement data obtained from a predetermined number of previous transient speed operations performed by at least the rotor, determine whether a vibration measurement obtained during the transient speed operation is indicative of a rotor anomaly by determining whether a trend exists for the predetermined percentile vibration amplitude for at least one of the plurality of predetermined rotor speed ranges and the at least one vibration sensor over a preset number of previous transient speed operations, wherein the preset number of previous transient speed operations is greater than two; and indicate the rotor anomaly exists in response to determining the trend exists.

A second aspect of the disclosure includes a computer-based method for detecting rotor anomalies in a rotor during transient speed operation, the method using a computing device including a processor and a memory, the method comprising: receiving vibration data obtained from the rotor by at least one vibration sensor during the transient speed operation; classifying the vibration data into one of a plurality of predetermined rotor speed ranges of the transient speed operation for the at least one vibration sensor, each speed range being between a standstill state and a full speed state of the rotor; determining a predetermined percentile vibration amplitude for each of the plurality of predetermined rotor speed ranges of the transient speed operation for the at least one vibration sensor; and using historical vibration measurement data obtained from a predetermined number of previous transient speed operations performed by at least the rotor, determining whether a vibration measurement obtained during the transient speed operation is indicative of a rotor anomaly by determining whether a trend exists for the predetermined percentile vibration amplitude for at least one of the plurality of rotor speed ranges and the at least one vibration sensor over a preset number of previous transient speed operations, wherein the preset number of previous transient speed operations is greater than two; and indicating the rotor anomaly exists in response to determining the trend exists.

A third aspect of the present disclosure includes a computer-readable storage device storing computer instructions, which when executed, enables a computer system to perform a method for detecting rotor anomalies, the method comprising: receiving vibration data obtained from a rotor by a vibration sensor during a transient speed operation; classifying the vibration data into one of a plurality of predetermined rotor speed ranges of the transient speed operation; determine a predetermined percentile vibration amplitude for each of the plurality of predetermined rotor speed ranges of the transient speed operation for the at least one vibration sensor; and using historical vibration measurement data obtained from a predetermined number of previous transient speed operations performed by at least the rotor, determine whether a vibration measurement obtained during the transient speed operation is indicative of a rotor anomaly by determining whether a trend exists for the predetermined percentile vibration amplitude for at least one of the plurality of rotor speed ranges and the at least one vibration sensor over a preset number of previous transient speed operations, wherein the preset number of previous transient speed operations is greater than two; and indicating the rotor anomaly exists in response to determining the trend exists.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Various embodiments of the present disclosure are directed to performing real-time monitoring of a turbine for rotor anomalies using vibration measurements obtained during a transient speed operation. Vibration measurements from at least one vibration sensor located about the turbine rotor are received at a computer system that provides the detecting system. The computer system can be on-site with the vibration sensor and rotor, or, more likely, at a remote, centralized monitoring system. The detecting system can be deployed independently to specifically monitor operation of the turbine, or can be a part of a controller used to otherwise control the turbine. In any event, a detecting system according to embodiments of the disclosure continually analyzes the operation of the turbine, or any other turbines part of a fleet, in real-time. The detecting system classifies the vibration measurements into one of a plurality of predetermined rotor speed ranges, and determines predetermined percentile vibration amplitudes for each of the plurality of predetermined rotor speed ranges, e.g., at the completion of the transient speed operation. Using historical vibration measurement data obtained from a predetermined number of previous transient speed operations performed by at least the rotor, the system determines whether a vibration measurement obtained during the transient speed operation is indicative of a rotor anomaly by determining whether a trend exists in the predetermined percentile vibration amplitude for at least one of the rotor speed ranges and the vibration sensor(s) over a preset number of previous transient speed operations. A rotor anomaly is indicated where a trend exists. Use of the trend prevents false alarms that can occur by just monitoring non-repeatable behavior outside an expected range based on previous data points. The detecting system also creates a dynamic baseline of similar transient speed operations, e.g., hot and/or or cold startups or shutdowns, which may be adjusted based on predefined events by, e.g., a detected anomaly. The detecting system may use, for example, a cumulative sum (CUSUM) algorithm to detect slow or fast and stable increases of the predetermined percentile vibration amplitudes while ignoring noise within the signal data. To avoid false alarming, persistence logic and/or relevancy weighting logic can also be used. An automated baseline resetting process may also be implemented to avoid additional alarming in case an increased level of vibrations remain at a stable level while reducing the alarm limit level again in case the anomaly was fixed at a site. An escalated or heightened review of the rotor and/or vibration sensor may be initiated if the system determines that the vibration data is starting to exhibit a trend. For example, a confirmatory turbine rotor anomaly analytic that involves using the vibration data may be conducted. In any event, the detecting system can then recommend a corrective action in response to determining the detection of a turbine rotor anomaly.

Technical effects of the various embodiments of the present disclosure include providing an effective solution for attaining real-time monitoring of a turbine rotor that determines potential detection of anomalies based on trends in vibration measurements for predetermined rotor speed ranges and/or at least one vibration sensor. This approach increases the probability of detecting rotor anomalies before they become significant, and avoids false alarms. Other technical effects include providing an effective solution for detecting rotor anomalies from only using transient speed operations.

Figure 1:
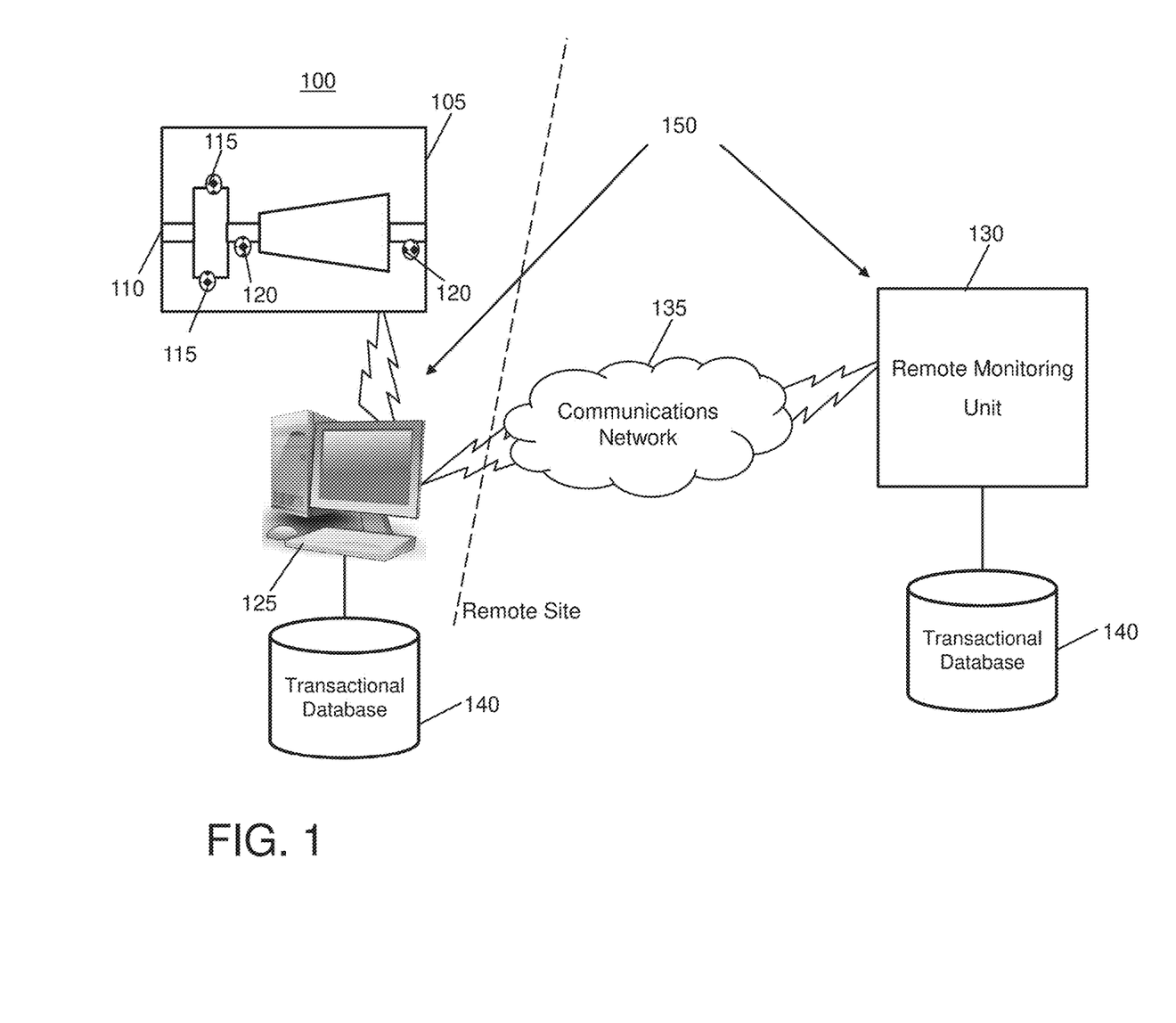
FIG. 1 is a schematic illustration of a system according to embodiments of the present disclosure.

Referring to the drawings, FIG. 1 is a schematic illustration of a turbine rotor monitoring system 100 according to one embodiment of the present disclosure. The various embodiments described herein are applicable for use with gas turbines and steam turbines. However, it should be apparent to those skilled in the art and guided by the teachings herein that the present disclosure is likewise applicable to any industrial machinery driven by rotor where it may be desirable to monitor vibration measurements to detect anomalies that arise in operation of the machinery. For example, axial compressors are one area in which the various embodiments of the present disclosure have utility.

As shown in FIG. 1, turbine rotor monitoring system 100 includes a turbine 105 having a rotor 110. At least one vibration sensor 115 is located about rotor 110 to measure vibrations during operation. For clarity, only two vibration sensors 115 are illustrated, however those skilled in the art will recognize that more or less sensors can be used. In one embodiment, vibration sensors 115 may include contacting and non-contacting sensors (e.g., accelerometers and proximity sensors). In one embodiment, vibration sensors 115 can be located in the bearing caps that contain bearings that facilitate rotation of rotor 110 during operation of turbine 105.

In the various embodiments of the present disclosure, the vibration measurements obtained from rotor 110 may occur during transient speed operations. As used herein, a transient speed operation may include start-up operations (cold or hot), shut-down operations and maintenance operations that occur at speeds that are reached in start-ups and shut-downs of turbine 105.

Turbine 105 as shown in FIG. 1 further includes one or more operational sensors 120 located about the turbine rotor to measure operational data associated with the turbine. For clarity, only two operational sensors 120 are illustrated, however those skilled in the art will recognize that a typical turbine could have many more sensors located thereabout to measure various operating parameters. Those skilled in the art will recognize that the location of operational sensors 120 can vary and are not limited to any one particular location. In one embodiment, operational sensors 120 may include speed sensors that measure the speed of rotor 110 during operation. Other operational sensors could include temperature sensors, pressure sensors, current sensors, etc. For clarity in explaining the various embodiments of the present disclosure only a few components associated with turbine 105 are illustrated and described herein. Those skilled in the art will appreciate that turbine 105 would have various other components that are not discussed herein.

As shown in FIG. 1, turbine rotor monitoring system 100 further includes on-site monitoring unit 125 that may monitor the vibration measurements obtained from vibration sensors 115 during the transient speed operation of turbine 105. In one embodiment, on-site monitoring unit 125 facilitates continued monitoring and processing of the vibration measurements sent by vibration sensors 115. As also shown in FIG. 1, a remote monitoring unit 130 is in communication with on-site monitoring unit 125 via a communications network 135 (e.g., wired connection or a wireless connection). Remote monitoring unit 130, i.e., a computing device thereof, is located geographically remote from vibration sensor(s) 115 and rotor 110. On-site monitoring unit 125 and/or remote monitoring unit 130 may provide turbine rotor anomaly detecting system 150 (hereinafter "detecting system 150"), according to embodiments of the disclosure. In one embodiment, remote monitoring unit 130 may receive the vibration measurements from on-site monitoring unit 125 via communications network 135, e.g., after completion of the transient speed operation, for determination of the presence of anomalies. Hence, in another embodiment, rather than on-site monitoring unit 125, remote monitoring unit 130 may facilitate continued monitoring and processing of the vibration measurements sent by vibration sensors 115. In any event, detecting system 150 enables monitoring unit 125 or 130 to perform operations that include: classifying the vibration measurements into one of a plurality of predetermined ranges of turbine rotor speed during the transient speed operation; determining maximum vibration data for each of the plurality of predetermined ranges of turbine rotor speed during the transient speed operation; using historical vibration measurement data, determine whether a trend exists in the vibrations measured: and indicate a rotor anomaly exists in response to determining a trend exists.

On-site monitoring unit 125 and/or remote monitoring unit 130 can store the vibration data in a transactional database 140 containing historical vibration measurement data obtained from a predetermined number of previous transient speed operations performed by: rotor 110 from turbine 105, any other turbines located at the site of turbine 105, and/or rotors of similar turbines operating at other locations. In the latter case, the historical vibration measurement data obtained may be from a plurality of different rotors, each rotor including the at least one vibration sensor. In this manner, historical vibration measurement data includes a large number of inputs, e.g., across a global fleet of similar turbines. Historical vibration measurement data from other locations can be forwarded to the site of turbine 105. The historical vibration measurement data obtained from the predetermined number of previous transient speed operations are also all of a same type, e.g., a hot startup, a cold startup or a shutdown. In this manner, historical vibration measurement data for a shutdown is not compared to that for a startup, and more particular types of startups that have different vibration profiles are compared to one another. In addition, the historical vibration measurement data obtained from the predetermined number of previous transient speed operations is specific to a particular vibration sensor 115 interacting with the rotors. That is, vibration measurements for a certain vibration sensor 115 is compared to historical vibration measurement data for the same vibration sensor either in the same turbine or the same vibration sensor in other turbines. For example, the historical vibration measurement data may be from vibration sensors 115 positioned at the bottom of a second bearing supporting the rotor in each turbine 105. In this manner, historical vibration measurement data for a first vibration sensor is not compared to that for a second, differently situated vibration sensor that would be expected to have a different vibration profile compared to the first vibration sensor. Those skilled in the art will recognize that on-site monitoring unit 125 and/or remote monitoring unit 130 can have other databases that store additional information (e.g., rules for fixing anomalies, corrective actions, turbine data, etc.), or it is possible to store this information and the information in transactional database 140 all in one database.

In one embodiment, on-site monitoring unit 125 can be a data acquisition system that collects sensor data from vibration sensors 115 and operational sensors 120, and that is programmed to perform the aforementioned processing operations on the collected data. One example of such a data acquisition system that can be used as on-site monitoring unit 125 is a commercially available monitoring unit such as the GE ON-SITE MONITOR provided by the General Electric Company. Those skilled in the art will recognize that on-site monitoring unit 125 may be deployed as part of a turbine controller. For example, the functionality performed by on-site monitoring unit 125 may be embodied in a commercially available turbine controller such as the MARK VI SPEEDTRONIC CONTROLLER™ provided by the General Electric Company. In one embodiment, remote monitoring unit 130 can be a central host computing unit that is online with on-site monitoring unit 125. Remote monitoring unit 130 can employ software, a plurality of rules and databases that allow an operator to perform remote monitoring and diagnostics of turbine 105, as well as other turbines located at that particular site and other remote sites.

Figure 2:
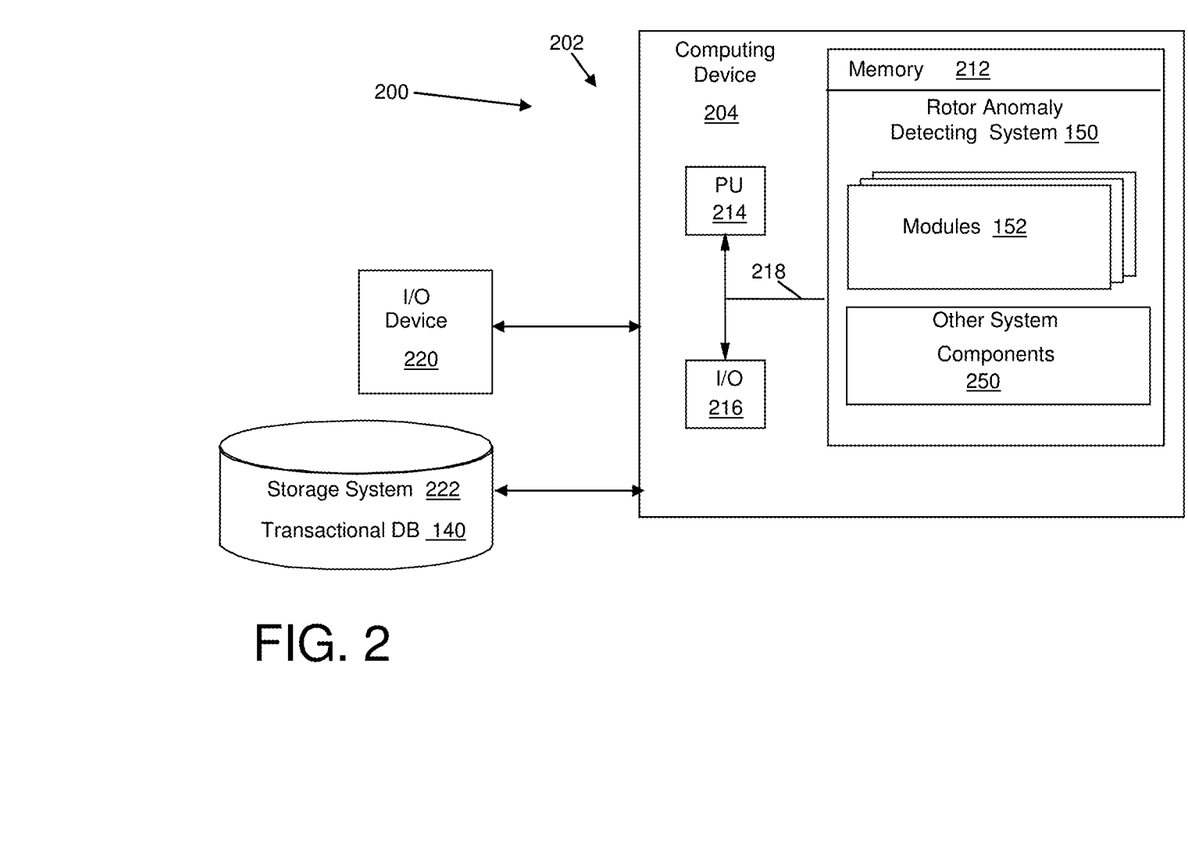
FIG. 2 is a schematic illustration of a computing device for implementing a detecting system according to embodiments of the present disclosure.

As shown in FIG. 2, each of on-site monitoring unit 125 and remote monitoring unit 130 can include a computing device 204. The present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2, an illustrative environment 200 for implementing a detecting system 150 according to embodiments of the disclosure is illustrated. To this extent, environment 200 includes a computer infrastructure 202 that can perform the various process steps described herein for detecting system 150. In particular, computer infrastructure 202 is shown including a computing device 204 that comprises detecting system 150, which enables computing device 104 to determine the presence of a rotor anomaly by performing the process steps of the disclosure.

Computing device 204 is shown including a memory 212, a processor (PU) 214, an input/output (I/O) interface 216, and a bus 218. Further, computing device 204 is shown in communication with an external I/O device/resource 220 and a storage system 222. As is known in the art, in general, processor 214 executes computer program code, such as rotor anomaly detecting system 150, that is stored in memory 212 and/or storage system 222. While executing computer program code, processor 214 can read and/or write data, such as historical vibration measurement data, vibration measurements, rotor speed, etc., to/from memory 212, storage system 222, and/or I/O interface 216. Bus 218 provides a communications link between each of the components in computing device 204. I/O interface 216 can comprise any device that enables a user to interact with computing device 204 or any device that enables computing device 204 to communicate with one or more other computing devices. Input/output devices (including but not limited to keyboards, displays, pointing devices, etc.) can be coupled to the system either directly or through intervening I/O controllers.

In any event, computing device 204 can comprise any general purpose computing article of manufacture capable of executing computer program code installed by a user (e.g., a personal computer, server, handheld device, etc.). However, it is understood that computing device 204 and detecting system 150 are only representative of various possible equivalent computing devices that may perform the various process steps of the disclosure. To this extent, in other embodiments, computing device 204 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 202 is only illustrative of various types of computer infrastructures for implementing the disclosure. For example, in one embodiment, computer infrastructure 202 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, detecting system 150 enables computer infrastructure 202 to determine the presence of a rotor anomaly. To this extent, detecting system 150 is shown including a number of modules 152 that perform the various operations described herein. It is understood that some of the various modules shown in FIG. 2 can be implemented independently, combined, and/or stored in memory for one or more separate computing devices that are included in computer infrastructure 202. Further, it is understood that some of the modules and/or functionality may not be implemented, or additional systems and/or functionality may be included as part of environment 200.

Those skilled in the art will recognize that it may be possible to implement some of the functionality performed by remote monitoring unit 130 in on-site monitoring unit 125, such that the on-site monitoring unit is able to process the vibration and operational measurements and eventually determine the presence of turbine rotor anomalies. Likewise, it may be possible to implement some of the functionality performed by on-site monitoring unit 125 in remote monitoring unit 130, such that the remote monitoring unit is able to perform operations that include collecting vibration measurements and operational measurements, analyzing the vibration measurements to determine the presence of turbine rotor anomalies.

Figure 3:
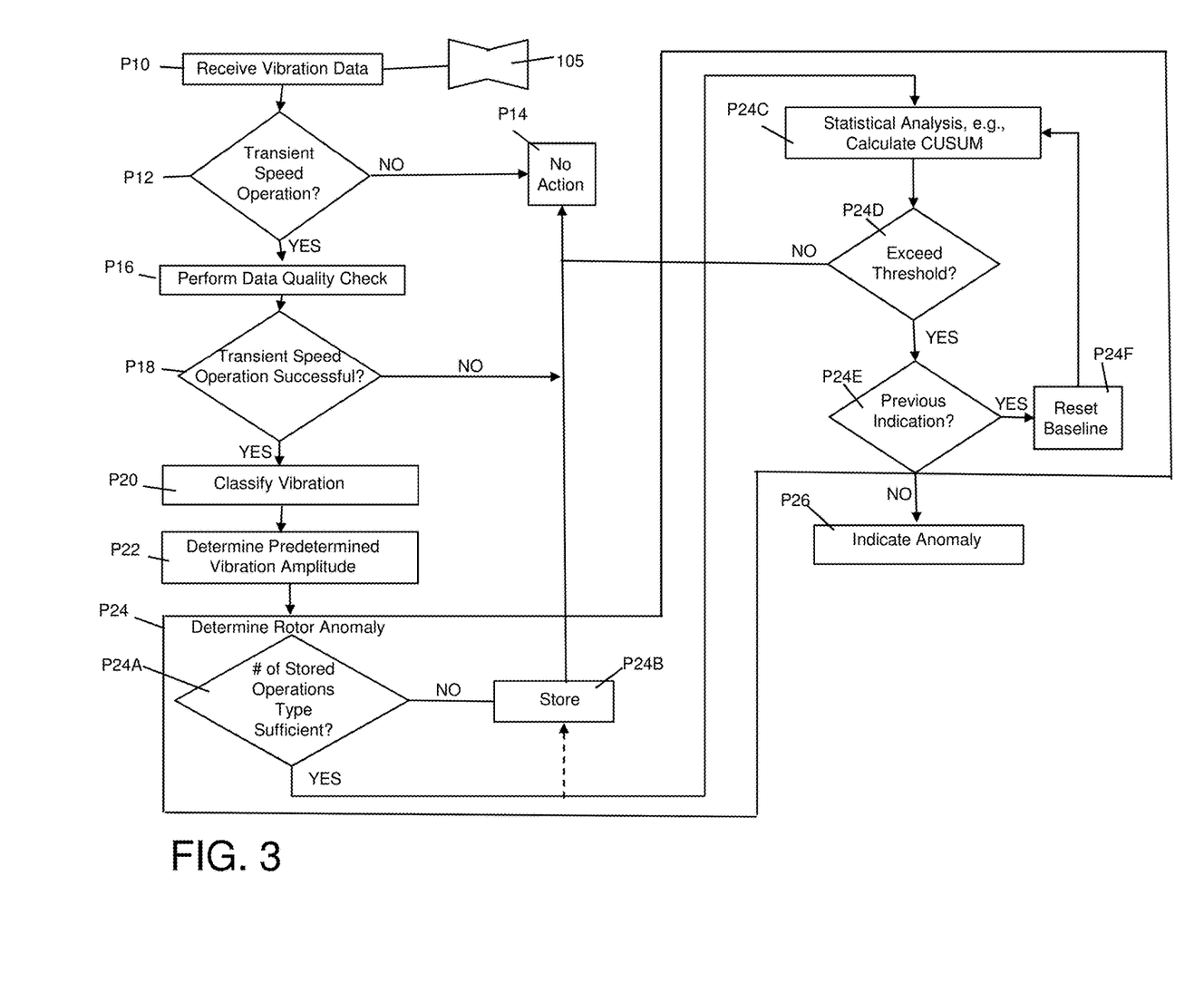
FIG. 3 is a flow diagram describing a method of operation associated with using the detecting system to detect the presence of rotor anomalies according to embodiments of the present disclosure.

FIG. 3 is a flow diagram describing the process operations associated with using detecting system 150 of FIG. 2 to detect the presence of rotor anomalies according to one embodiment of the present disclosure. The processes of detecting the presence of turbine rotor anomalies begins at process P10 at which detecting system 150 receives vibration data obtained from the rotor 110 by at least one vibration sensor 115 during the transient speed operation. Detecting system 150 may also receive other operational measurements (e.g., pressure, rotor speed, temperature, etc.) from vibration sensor(s) 115 and operational sensor(s) 120, respectively, from turbine 105.

If not already known, in optional process P12, detecting system 150 determines at whether the measurements received from the sensors 115, 120 are/were collected while turbine 105 is undergoing a transient speed operation. If detecting system 150 determines that turbine 105 is not undergoing a transient speed operation, i.e., no at process P12, then no further action is taken at P14. Note that although various embodiments of the present disclosure are directed to detecting anomalies at transient speed operation, those skilled in the art will recognize that detecting system 150 could also have functions that are executed during steady-state operations to determine rotor anomalies that arise during full speed or stand still operations. In one embodiment, detecting system 150 can analyze vibration measurements obtained during both transient speed operations and steady-state operations to determine a more comprehensive analysis and detection of rotor anomalies.

Continuing with FIG. 2, if it is determined at P12, i.e., yes, that turbine 105 is operating in a transient speed operation, then detecting system 150 continues with its processing of the vibration and operational measurements obtained from at least vibration sensors 115. In process P16, detecting system 150 may optionally perform a data quality check of the data generated from vibration sensor(s) 115 (and operational sensors 120). The data quality check may entail determining whether the measurements obtained from vibration sensors 115 (and operational sensors 120) are reasonable and healthy (i.e., above or below a certain limit). Based on the data quality check, detecting system 150 determines whether the sensors are bad or have failed. Generally, a sensor will be considered to be bad or have failed if the measurements are not reasonable as determined by the data quality check operation. If detecting system 150 determines that any of the sensors are bad or have failed, then any measurements that they have generated are ignored. In one embodiment, any measurements generated from a sensor that was deemed to be bad or failed could be flagged so that detecting system 150 avoids processing any such data.

In process P18, detecting system 150 may optionally determine the transient speed operation was successful, i.e., after its completion. In some cases, a transient speed operation may not complete or there may be some other anomaly about the operation that makes it non-indicative of a set of data that detecting system 150 should rely on for a current evaluation for a rotor anomaly, or for addition to the historical vibration measurement data. In addition, at process P18, detecting system 150 may identify a type of transient operation, e.g., hot startup, cold startup or shutdown. This identification can be made based on, for example, the rotor temperature observed at the beginning of the transient event, the observed vibration profile during the transient speed operation (e.g., a hot startup has faster rising vibration than a cold startup), and/or based on other observed operational parameters (e.g., operation counters) of turbine 105 during the transient operation or during prior operating conditions, e.g., to identify a blocked rotor.

In process P20, detecting system 150 classifies the vibration measurements into one of a plurality of predetermined ranges of turbine rotor speed. Classifying the vibration measurements into one of a plurality of predetermined rotor speed ranges may include using operational sensors 120 to ascertain the speed of rotor 110 for each vibration measurement obtained from vibration sensors 115 during the transient speed operation, and placing the vibration measurements in one of the rotor speed ranges of classification. The predetermined ranges of turbine rotor speed can represent, for example, rotor speeds that are sufficient to cause rotor 110 to exhibit distinct vibrational behavior due to the natural frequencies of the rotor itself. Each speed range is between a standstill state (0 speed) and a full speed state of the rotor 110. In one embodiment, plurality of predetermined rotor speed ranges may include four different rotor speed ranges between the standstill state and the full speed state. For example, the plurality of predetermined rotor speed ranges may include a rotor speed range covering from 25% up to 40% of the full speed state, a rotor speed range covering from over 40% up to 65% of the full speed state, a rotor speed range covering from 65% up to 95% of the full speed state, and a rotor speed range covering over 95% up to 99% of the full speed range (i.e., the first point above full speed with no load). Those skilled in the art will recognize that these ranges of turbine rotor speed classification are only examples, and that many other possible ranges can be used. Thus, the aforementioned ranges are not meant to limit the scope of the various embodiments of the present disclosure described herein.

In process P22, detecting system 150 determines a predetermined percentile vibration amplitude for each of the plurality of predetermined rotor speed ranges of the transient speed operation for vibration sensor(s) 115. The operation of determining the predetermined percentile vibration amplitude for each of the rotor speed ranges may include comparing incoming vibration data obtained from vibration sensors 115 at a certain rotor speed to a maximum value that is currently stored in memory of detecting system 150 as turbine 105 cycles through the transient speed operation. If an incoming vibration measurement exceeds a maximum value stored in memory, then it replaces that value for that particular rotor speed range of classification. On the other hand, if the incoming vibration measurement does not exceed the maximum value stored in memory, then the existing value remains in memory. In another embodiment, the predetermined percentile vibration amplitude may be an average of predetermined percentile vibration amplitudes within a $90^{th}$ percentile of a vibration profile across a given speed range or another predefined percentile value, which may be adjusted to improve the accuracy of detecting system 150. This latter approach removes possible outliers, and may make the predetermined percentile vibration amplitude more accurate. Regardless of the process used, process P22 may be performed continually during the transient speed operation as rotor 110 moves through the various ranges of rotor speed. That is, despite process P22's position in the flow diagram, it may be performed continually during the transient speed operation.

In process P24, detecting system 150 determines whether a vibration measurement obtained during the transient speed operation is indicative of a rotor anomaly by determining whether a trend exists in the predetermined percentile vibration amplitude for at least one of the plurality of rotor speed ranges and the particular vibration sensor 115 over a preset number of previous transient speed operations. Process P24 uses historical vibration measurement data obtained from a predetermined number of previous transient speed operations performed by at least the rotor 110 (i.e., rotor 110 in turbine 105 and perhaps other rotors 110 in similar turbines 105). The predetermined number of previous transient speed operations required to have a usable historical vibration measurement database can be user-defined, e.g., 50 for a specific rotor being in a cold startup transient operations, 200 for a specific rotor being in a hot startup transient operations, etc.

Process P24 may include a number of sub-processes. In one optional sub-process P24A, detecting system 150 may preliminarily determine whether a sufficient number of transient speed operations of the type at issue have been previously stored. That is, detecting system 150 may determine whether the predetermined number of previous transient speed operations required to have a usable historical vibration measurement database has been met. Sub-process P24A ensures detecting system 150 has sufficient historical vibration measurement data for the particular type of transient speed operation, e.g., hot startup, to identify trends therein. As noted, the predetermined number may be user specified to ensure accuracy, e.g., three, 50, 100, 500, etc. If detecting system 150 knows the number of previous transient speed operations in historical vibration measurement data exceeds the predetermined number, then sub-process P24A can be omitted. Otherwise, sub-process P24A can be performed. If there is an insufficient number of previous transient speed operations, i.e., no at P24A, at sub-process P24B, detecting system 150 stores the vibration measurements and returns to process P12. If a sufficient number of previous transient speed operations exist in the historical data, i.e., yes at P24A, detecting system 150 proceeds to sub-process P24C and may store the vibration measurements into the historical data, sub-process P24B.

At process P24C, detecting system 150 performs a statistical analysis to determine whether a trend, i.e., either increasing or decreasing, exists for at least one of a rotor speed range and a vibration sensor 115. The statistical analysis can be carried out for each predetermined rotor speed range and for each vibration sensor, i.e., where more than one vibration sensor is employed. Various statistical analysis techniques to identify a trend in data are available to those with skill in the art such as but not limited to: data clustering and moving average comparison as well as data smoothing or auto-correlation. In one embodiment, determining whether the trend exists includes calculating a cumulative sum (CUSUM) in process P24C, and in process P24D, identifying the trend in response to the cumulative sum exceeding a preset number of previous transient speed operations. In one embodiment, the preset number of previous transient speed operations is greater than two. The preset number of previous transient speed operations may be one of an increasing trend threshold, i.e., for an increasing trend, and a decreasing trend threshold, i.e., for a decreasing trend. In a cumulative sum, or running total, calculation the total sum of vibration measurements as it grows with time is calculated, hence indicating the total contribution so far of a given vibration measurement against time. This embodiment provides the benefit of detecting small continuous changes while enabling quantification and qualification of the trend in terms of direction and magnitude of change. The preset number of previous transient speed operations as implemented through the increasing trend threshold or the decreasing trend threshold can be user defined (e.g., two or more). For example, the thresholds may depend on vibration sensor type, sensor location, sensor unit of measurement scale, turbine type and type of the transient speed operation. These factors impact the magnitude of the required change to differentiate between an anomaly and normal sensor white noise.

In process P24E, detecting system 150 optionally determines whether an (previous) indication of a rotor anomaly having already been made, and if so, at process P24F, resets a baseline for the cumulative sum calculating (in process P24C) in response to an (previous) indication of a rotor anomaly having already been made. This persistence checking process prevents repetitive indications of an anomaly.

In one embodiment, if no previous indication was made, i.e., no in process P24E, in process P26, detecting system 150 may then indicate the rotor anomaly exists in response to determining the trend exists. At this stage, a user can take corrective action, perhaps with a recommendation from monitoring unit 125 and/or 130 (FIG. 1).

Figure 4:
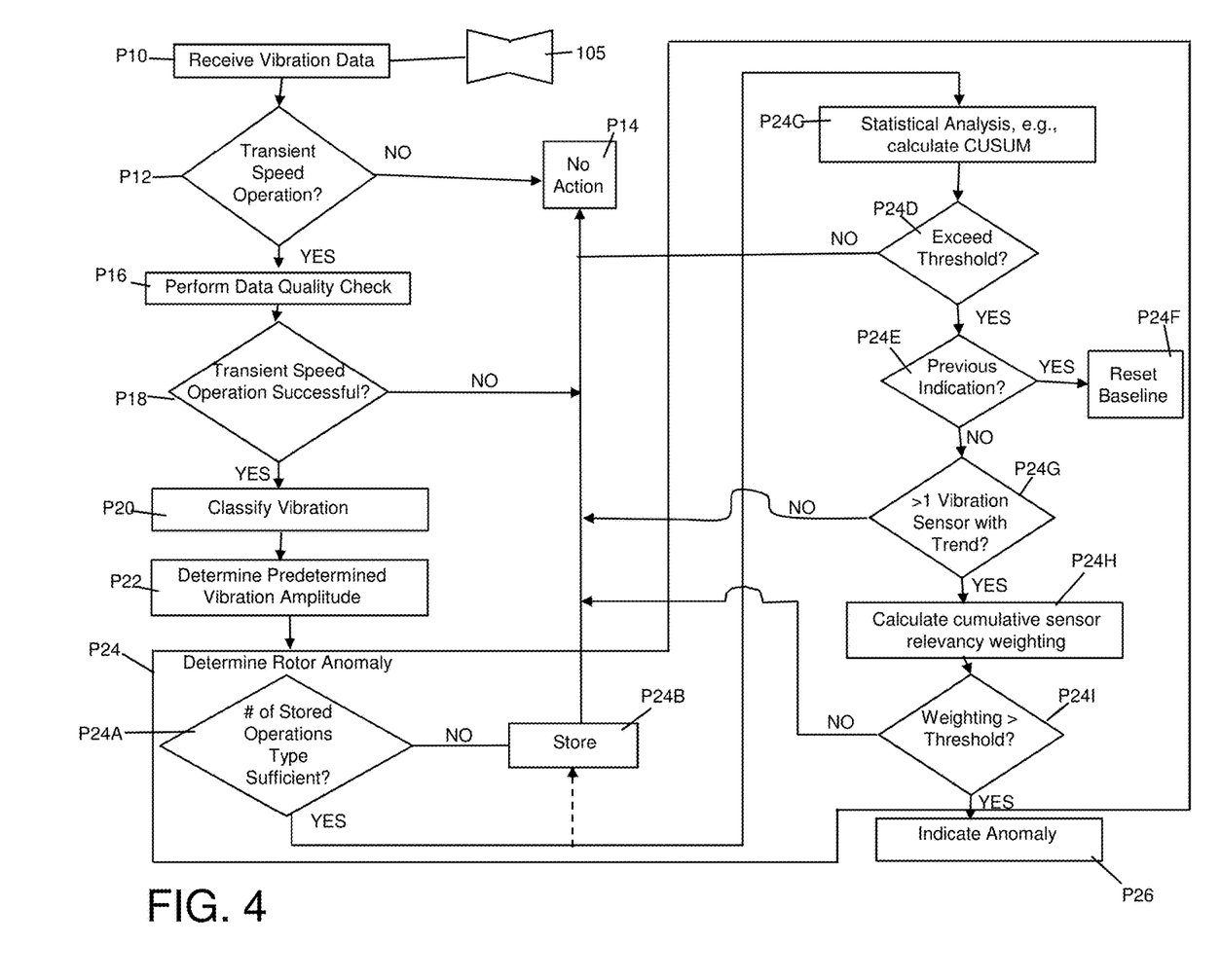
FIG. 4 is a flow diagram describing a method of operation associated with using the detecting system with vibration sensor relevancy weighting to detect the presence of rotor anomalies according to other embodiments of the present disclosure.
Figure 5:
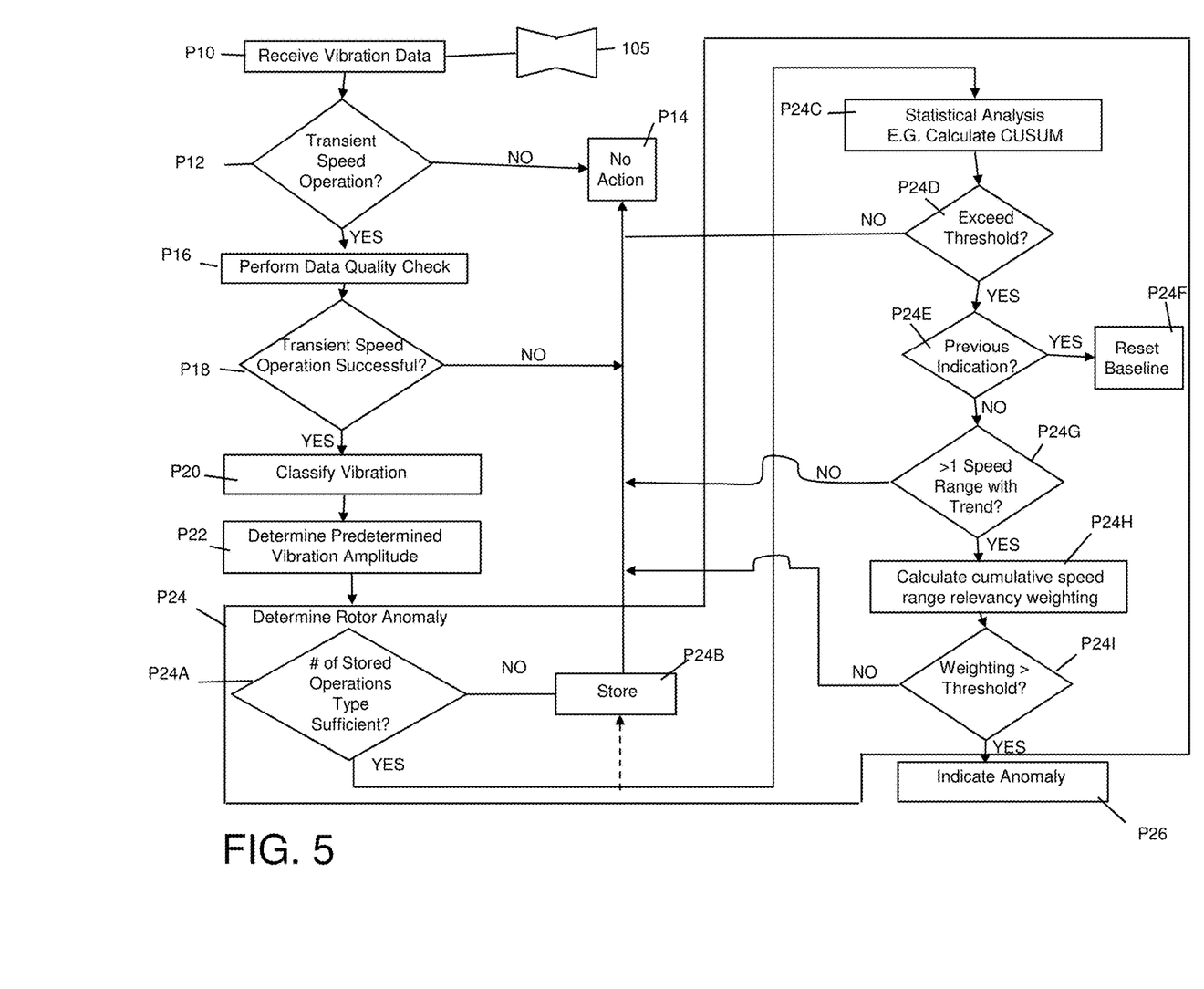
FIG. 5 is a flow diagram describing a method of operation associated with using the detecting system with rotor speed range relevancy weighting to detect the presence of rotor anomalies according to other embodiments of the present disclosure.
Figure 6:
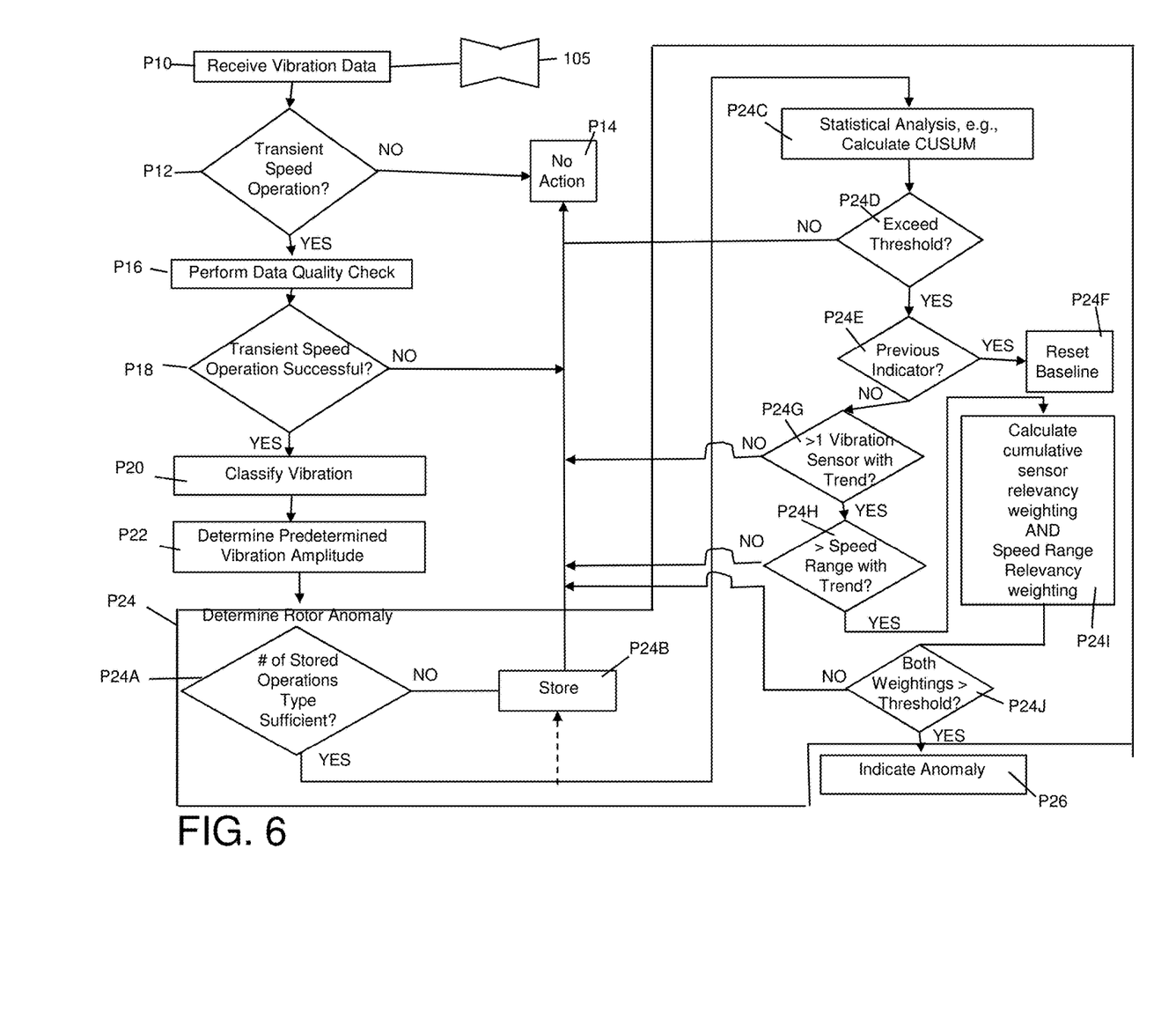
FIG. 6 is a flow diagram describing a method of operation associated with using the detecting system with rotor speed range and vibration sensor relevancy weighting to detect the presence of rotor anomalies according to other embodiments of the present disclosure.

FIGS. 4-6 are illustrative flow diagrams describing the process operations associated with using detecting system 150 of FIG. 2 to detect the presence of rotor anomalies according to other embodiments of the present disclosure. In certain embodiments, detection system 150 may implement a weighting system that weights the relevancy of a detected rotor anomaly for certain vibration sensors 115 over other vibration sensors for a predetermined rotor speed range, and/or weights the relevancy of a detected rotor anomaly for certain predetermined rotor speed ranges over other rotor speed ranges. In this manner, vibration sensors 115 that have been identified as providing more accurate indications of issues with the rotor or other structure may be given higher consideration. For example, vibration measurements from a vibration sensor 115 which is of a proximity type may be considered more indicative of issues than measurements from other vibration sensor types, and may be given a higher sensor relevancy weighting. Further, rotor speed ranges that have been identified as providing more accurate indications of issues with the rotor or other structure may be given higher consideration. For example, the rotor speed range of higher than 95% may be considered more indicative of issues than measurements from other speed ranges for certain types of turbines, and be assigned a higher range relevancy weighting. Additionally, the weights could be adjusted for a vibration sensor type in case certain predefined conditions apply. The conditions could be related to, for example, certain anomaly detections for individual vibration sensors during individual speed ranges, e.g., set the weights to 0 for one sensor in case only one vibration sensor 115 detects increased values, which could indicate a faulty sensor. In this case, detecting system 150 may include an interface, e.g., a graphical user interface, allowing assignment of a sensor relevancy weighting to various vibration sensors where a plurality of vibration sensors 115 are employed, and/or range relevancy weighting for various predetermined rotor speed ranges.

FIG. 4 is an illustrative flow diagram describing the process operations associated with using detecting system 150 of FIG. 2 to detect the presence of rotor anomalies using sensor relevancy weighting alone. FIG. 4 is substantially identical to FIG. 3 up to process P24F. In optional process P24G, detecting system 150 determines whether a trend exists for more than one of the plurality of vibration sensors 115. If so, at process P24H, detecting system 150 calculates a cumulative sensor relevancy weighting for the more than one of the plurality of vibration sensors 115 exhibiting a trend based on the respective sensor relevancy weightings. In process P24I, detecting system 150 determines whether the cumulative sensor relevancy weighting of the vibration sensors exceeds a threshold, and if so, at process P26, detecting system 150 indicates an anomaly. This threshold may be dependent on, for example, the number of vibration sensors 115 installed on the rotor 110 and on the number of predefined rotor speed ranges. If the weighting does not exceed the threshold, i.e., no at process P24I, then processing returns to process P14.

FIG. 5 is an illustrative flow diagram describing the process operations associated with using detecting system 150 of FIG. 2 to detect the presence of rotor anomalies using speed range relevancy weighting alone. FIG. 5 is substantially identical to FIG. 3 up to process P24F. As noted, in certain embodiments, detection system 150 may implement a weighting system that weights each of the predetermined rotor speed ranges. Here, each rotor speed range has an assigned range relevancy weighting. In optional process P24G, detecting system 150 determines whether a trend exists for more than one of the plurality of predetermined rotor speed ranges. If so, at process P24H, detecting system 50 calculates a cumulative range relevancy weighting for the predetermined rotor speed ranges exhibiting a trend based on the respective range relevancy weightings. In process P24I, detecting system 150 determines whether the cumulative sensor relevancy weighting of the vibration sensors exceeds a threshold, and if so, at process P26, detecting system 150 indicates an anomaly. If the weighting does not exceed the threshold, i.e., no at process P24I, then processing returns to process P14.

FIG. 6 is a flow diagram describing the process operations associated with using detecting system 150 of FIG. 2 to detect the presence of rotor anomalies using speed range and vibration sensor relevancy weighting together. FIG. 6 is substantially identical to FIG. 3 up to process P24F. In optional process P24G, detecting system 150 determines whether a trend exists for more than one of the plurality of vibration sensors. If so, at process P24H, detecting system 150 determines whether a trend exists for more than one of the plurality of predetermined rotor speed ranges. If no at either of process P24G or P24H, processing returns to process P14. Process P24G and P24H can be reversed in order, if desired. If yes at both of processes P24G and P24H, at process P24I, detecting system 150 calculates a cumulative range relevancy weighting for the predetermined rotor speed ranges exhibiting a trend based on the respective range relevancy weightings, and calculates a cumulative sensor relevancy weighting for the plurality of vibration sensors exhibiting a trend based on the respective sensor relevancy weightings. In process P24I, detecting system 150 determines whether the cumulative range relevancy weighting of the predetermined rotor speed ranges exceeds a threshold and whether the cumulative sensor relevancy weighting of the vibration sensors exceeds a threshold. If both thresholds are exceeded, at process P26, detecting system 150 indicates an anomaly. If one or both of cumulative weightings does not exceed the threshold, i.e., no at process P24J, then processing returns to process P14.

Embodiments of the disclosure provide detection of minor or gradual rotor unbalance changes that can only be identified during transient speed operations with analysis of the vibration data during multiple start-up and/or shutdown events. Embodiments of the disclosure allow detection of rotor anomalies that would otherwise require very careful manual attention to the transient vibration patterns and comparison over multiple transient cycles of the turbine.

The foregoing flow diagrams show some of the processing functions associated with detecting the presence of a turbine rotor anomaly. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Although the description heretofore has been directed to determining anomalies from one turbine, those skilled in the art will recognize that the various embodiments of the present disclosure are suitable for rotor anomaly detecting the operation with multiple turbines at one particular site, and even is suitable for rotor anomaly detecting the operation of turbines located in multiple locations. For example, in a site where there was more than one turbine 105, on-site monitoring unit 125 with a detecting system 150 could be coupled to each of these turbines and would receive the various measurements (vibration measurements, speed measurements, etc.). In such a scenario, a detecting system 150 at on-site monitoring unit 125 would continually perform the operations described herein. Alternatively, on-site monitoring unit 125 may transmit vibration data from the turbine(s) located at the site to a detecting system 150 at remote monitoring unit 130 via communications network 135 for analysis to determine the presence of a rotor anomaly.

Those skilled in the art will recognize that the various embodiments of the present disclosure can be modified to combine the turbine rotor anomaly detection methodology used for transient speed operations in combination with anomalies detected from full-speed operation data to attain a more comprehensive detection of rotor anomalies that may exist.

In another embodiment, it would be conceivable to obtain an even more comprehensive detection of rotor anomalies by combining the transient speed operation anomaly detection processes described herein with full speed operation anomaly detection processes and with frequency information derived the vibration measurements (e.g., using a Fourier Transform to determine certain vibration amplitudes and frequencies associated with the measurements). In this embodiment, one would have to retrofit the turbines with the necessary equipment to obtain the frequency data associated with the vibration measurements, and change the software at the on-site rotor anomaly detecting unit and/or the remote rotor anomaly detecting unit to accommodate such operations.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computing system for detecting rotor anomalies in a rotor during transient speed operation, the computing system comprising a computing device programmed to:
   receive vibration data obtained from the rotor by at least one vibration sensor during the transient speed operation;
   classify the vibration data into one of a plurality of predetermined rotor speed ranges of the transient speed operation for the at least one vibration sensor, each speed range being between a standstill state and a full speed state of the rotor;
   determine a predetermined percentile vibration amplitude for each of the plurality of predetermined rotor speed ranges of the transient speed operation for the at least one vibration sensor; and
   using historical vibration measurement data obtained from a predetermined number of previous transient speed operations performed by at least the rotor, determine whether a vibration measurement obtained during the transient speed operation is indicative of a rotor anomaly by determining whether a trend exists in the predetermined percentile vibration amplitude for at least one of the plurality of predetermined rotor speed ranges and the at least one vibration sensor over a preset number of previous transient speed operations, wherein the preset number of previous transient speed operations is greater than two; and
   indicate the rotor anomaly exists in response to determining the trend exists.

2. The computing system of claim 1, wherein determining whether the trend exists includes calculating a cumulative sum and identifying the trend in response to the cumulative sum exceeding one of an increasing trend threshold and a decreasing trend threshold.

3. The computing system of claim 2, further comprising resetting a baseline for the cumulative sum calculating in response to an indication of a rotor anomaly.

4. The computing system of claim 1, wherein:
   the at least one vibration sensor includes a plurality of vibration sensors, each vibration sensor having a sensor relevancy weighting,
   the determining whether the trend exists includes determining whether a trend exists for more than one of the plurality of vibration sensors; and
   further comprising: in response to more than one of the plurality of vibration sensors exhibiting a trend, calculating a cumulative sensor relevancy weighting for the more than one of the plurality of vibration sensors exhibiting a trend based on the respective sensor relevancy weightings, and
   wherein the indicating occurs in response to the trend existing for the more than one vibration sensors and the cumulative sensor relevancy weighting of the more than one vibration sensors exceeding a threshold.

5. The computing system of claim 1, wherein each of the plurality of predetermined rotor speed ranges has a range relevancy weighting,
   further comprising: in response to more than one of the plurality of predetermined rotor speed ranges exhibiting a trend, calculating a cumulative range relevancy weighting for the more than one of the plurality of predetermined rotor speed ranges exhibiting a trend based on the respective range relevancy weightings, and
   wherein the indicating occurs in response to the trend existing for the more than one predetermined rotor speed range and the cumulative range relevancy weighting of the more than one predetermined rotor speed ranges exceeding a threshold.

6. The computing system of claim 5, wherein the plurality of predetermined rotor speed ranges includes four different rotor speed ranges between the standstill state and the full speed state.

7. The computing system of claim 6, wherein the plurality of predetermined rotor speed ranges includes: a first rotor speed range covering from 25% up to 40% of the full speed state, a second rotor speed stage covering from over 40% up to 65% of the full speed state, a third rotor speed range covering from over 65% up to 95% of the full speed state, and a fourth rotor speed range covering from over 95% up to 99% of the full speed state.

8. The computing system of claim 1, wherein:
   the at least one vibration sensor includes a plurality of vibration sensors, each vibration sensor having a sensor relevancy weighting, and each of the plurality of predetermined rotor speed ranges has a range relevancy weighting,
   the determining whether the trend exists includes determining whether a trend exists for more than one of the plurality of vibration sensors; and
   further comprising, in response to:
   more than one of the plurality of vibration sensors exhibiting a trend, calculating a cumulative sensor relevancy weighting for the more than one of the plurality of vibration sensors exhibiting a trend based on the respective sensor relevancy weightings, and
   more than one of the plurality of predetermined rotor speed ranges exhibiting a trend, calculating a cumulative range relevancy weighting for the more than one of the plurality of predetermined rotor speed ranges exhibiting a trend based on the respective range relevancy weightings,
   wherein the indicating occurs in response to:
   the trend existing for the more than one vibration sensors and the cumulative relevancy weighting of the more than one vibration sensors exceeding a first threshold, and the trend existing for the more than one predetermined rotor speed range and the cumulative relevancy weighting of the more than one predetermined rotor speed ranges exceeding a second threshold.

9. The computing system of claim 1, wherein the computing device is located geographically remote from the at least one vibration sensor and the rotor.

10. The computing system of claim 1, wherein the transient speed operations of the historical vibration measurement data obtained from the predetermined number of previous transient speed operations performed by at least the rotor and that of the received vibration data are all of a same type: one of a hot startup, a cold startup and a shutdown.

11. The computing system of claim 1, wherein the predetermined percentile vibration amplitude is an average of predetermined percentile vibration amplitudes within a $90^{th}$ percentile of a vibration profile across a given speed range.

12. The computing system of claim 1, wherein the historical vibration measurement data obtained from the predetermined number of previous transient speed operations performed by at least the rotor includes vibration measurement data from a plurality of different rotors, each rotor including the at least one vibration sensor.

13. A computer-based method for detecting rotor anomalies in a rotor during transient speed operation, the method using a computing device including a processor and a memory, the method comprising:
receiving vibration data obtained from the rotor by at least one vibration sensor during the transient speed operation;
classifying the vibration data into one of a plurality of predetermined rotor speed ranges of the transient speed operation for the at least one vibration sensor, each speed range being between a standstill state and a full speed state of the rotor;
determining a predetermined percentile vibration amplitude for each of the plurality of predetermined rotor speed ranges of the transient speed operation for the at least one vibration sensor; and
using historical vibration measurement data obtained from a predetermined number of previous transient speed operations performed by at least the rotor, determining whether a vibration measurement obtained during the transient speed operation is indicative of a rotor anomaly by determining whether a trend exists in the predetermined percentile vibration amplitude for at least one of the plurality of predetermined rotor speed ranges and the at least one vibration sensor over a preset number of previous transient speed operations, wherein the preset number of previous transient speed operations is greater than two; and
indicating the rotor anomaly exists in response to determining the trend exists.

14. The method of claim 13, wherein determining whether the trend exists includes calculating a cumulative sum and identifying the trend in response to the cumulative sum exceeding one of an increasing trend threshold and a decreasing trend threshold, and
further comprising resetting a baseline for the cumulative sum calculating in response to an indication of a rotor anomaly.

15. The method of claim 13, wherein:
the at least one vibration sensor includes a plurality of vibration sensors, each vibration sensor having a sensor relevancy weighting,
the determining whether the trend exists includes determining whether a trend exists for more than one of the plurality of vibration sensors; and
further comprising: in response to more than one of the plurality of vibration sensors exhibiting a trend, calculating a cumulative sensor relevancy weighting for the more than one of the plurality of vibration sensors exhibiting a trend based on the respective sensor relevancy weightings, and
wherein the indicating occurs in response to the trend existing for the more than one vibration sensors and the cumulative sensor relevancy weighting of the more than one vibration sensors exceeding a threshold.

16. The method of claim 13, wherein each of the plurality of predetermined rotor speed ranges has a range relevancy weighting,
further comprising: in response to more than one of the plurality of predetermined rotor speed ranges exhibiting a trend, calculating a cumulative range relevancy weighting for the more than one of the plurality of predetermined rotor speed ranges exhibiting a trend based on the respective range relevancy weightings, and
wherein the indicating occurs in response to the trend existing for the more than one predetermined rotor speed range and the cumulative range relevancy weighting of the more than one predetermined rotor speed ranges exceeding a threshold.

17. The method of claim 13, wherein:
the at least one vibration sensor includes a plurality of vibration sensors, each vibration sensor having a sensor relevancy weighting, and each of the predetermined rotor speed ranges has a range relevancy weighting,
the determining whether the trend exists includes determining whether a trend exists for more than one of the plurality of vibration sensors; and
further comprising, in response to:
more than one of the plurality of vibration sensors exhibiting a trend, calculating a cumulative sensor relevancy weighting for the more than one of the plurality of vibration sensors exhibiting a trend based on the respective sensor relevancy weightings, and
more than one of the plurality of predetermined rotor speed ranges exhibiting a trend, calculating a cumulative range relevancy weighting for the more than one of the plurality of predetermined rotor speed ranges exhibiting a trend based on the respective range relevancy weightings,
wherein the indicating occurs in response to:
the trend existing for the more than one vibration sensors and the cumulative relevancy weighting of the more than one vibration sensors exceeding a first threshold, and
the trend existing for the more than one predetermined rotor speed range and the cumulative relevancy weighting of the more than one predetermined rotor speed ranges exceeding a second threshold.

18. The method of claim 13, wherein the transient speed operations of the historical vibration measurement data obtained from the predetermined number of previous transient speed operations performed by at least the rotor and that of the received vibration data are all of a same type: one of a hot startup, a cold startup and a shutdown.

19. The method of claim 13, wherein the historical vibration measurement data obtained from the predetermined number of previous transient speed operations performed by at least the rotor includes vibration measurement data from a plurality of different rotors, each rotor including the at least one vibration sensor.

20. A computer-readable storage device storing computer instructions, which when executed, enables a computer system to perform a method for detecting rotor anomalies, the method comprising:
  receiving vibration data obtained from a rotor by a vibration sensor during a transient speed operation;
  classifying the vibration data into one of a plurality of predetermined rotor speed ranges of the transient speed operation;
  determine a predetermined percentile vibration amplitude for each of the plurality of predetermined rotor speed ranges of the transient speed operation for the at least one vibration sensor; and
  using historical vibration measurement data obtained from a predetermined number of previous transient speed operations performed by at least the rotor, determine whether a vibration measurement obtained during the transient speed operation is indicative of a rotor anomaly by determining whether a trend exists in the predetermined percentile vibration amplitude for at least one of the plurality of rotor speed ranges and the at least one vibration sensor over a preset number of previous transient speed operations, wherein the preset number of previous transient speed operations is greater than two; and
  indicating the rotor anomaly exists in response to determining the trend exists.

* * * * *